(12) United States Patent
O'Brien

(10) Patent No.: US 11,053,018 B2
(45) Date of Patent: Jul. 6, 2021

(54) FLIGHT VEHICLE ENGINE INLET WITH INTERNAL DIVERTER, AND METHOD OF CONFIGURING

(71) Applicant: Raytheon Company, Waltham, MA (US)

(72) Inventor: Timothy F. O'Brien, Vail, AZ (US)

(73) Assignee: Raytheon Company, Waltham, MA (US)

( * ) Notice: Subject to any disclaimer, the term of this patent is extended or adjusted under 35 U.S.C. 154(b) by 324 days.

(21) Appl. No.: 16/019,720

(22) Filed: Jun. 27, 2018

(65) Prior Publication Data

US 2020/0002020 A1 Jan. 2, 2020

(51) Int. Cl.
*B64D 33/02* (2006.01)
*F02C 7/04* (2006.01)
*B64C 30/00* (2006.01)

(52) U.S. Cl.
CPC .............. *B64D 33/02* (2013.01); *F02C 7/04* (2013.01); *B64C 30/00* (2013.01); *B64D 2033/026* (2013.01); *B64D 2033/0226* (2013.01)

(58) Field of Classification Search
CPC .............. B64D 33/02; B64D 2033/026; B64D 2033/0226
See application file for complete search history.

(56) References Cited

U.S. PATENT DOCUMENTS

| 2,735,612 A | * | 2/1956 | Hausmann | ............... | F01D 5/143 |
| | | | | | 415/208.1 |
| 3,005,309 A | * | 10/1961 | Rae | ........................... | F02C 7/04 |
| | | | | | 138/44 |

(Continued)

FOREIGN PATENT DOCUMENTS

| EP | 1 445 465 A1 | 8/2004 |
| EP | 1 898 080 A2 | 3/2008 |

(Continued)

OTHER PUBLICATIONS

Billig Frederick S et al: "Comparison of Planar and Axisymmetric Flowpaths for Hydrogen Fueled Space Access Vehicles", AIAA/SAE/ASME/ASEE Joint Propulsion Conference and Exhi, Jul. 23, 2003 (Jul. 23, 2003), pp. 1-12.

(Continued)

*Primary Examiner* — Richard R. Green
*Assistant Examiner* — William L Gmoser
(74) *Attorney, Agent, or Firm* — Renner, Otto, Boisselle & Sklar, LLP

(57) ABSTRACT

An inlet for a flight vehicle engine, such as for a supersonic or hypersonic engine, includes an internal flow diverter to divert boundary layer flow. The flow diverter is configured to minimize disruption to flow outside the diverted boundary by being configured through use of a flow field that is also used to configure the walls of the inlet. The flow field that is used to configure an inlet-creating shape and a diverter-creating shape has the same flow generator, contraction ratio, compression ratio, mass capture ratio, pressure ratio between entrance and exit, and/or Mach number, for example. The internal diverter may be configured so as to allow arbitrary selection of a leading edge shape for the internal diverter, for example to use a shape that helps avoid radar detection.

18 Claims, 5 Drawing Sheets

(56) References Cited

U.S. PATENT DOCUMENTS

| | | | |
|---|---|---|---|
| 3,941,336 A * | 3/1976 | Nangia | B64D 33/02 |
| | | | 244/53 B |
| 4,194,519 A | 3/1980 | Baker et al. | |
| 5,082,206 A | 1/1992 | Kutschenreuter, Jr. et al. | |
| 5,779,189 A * | 7/1998 | Hamstra | B64C 7/00 |
| | | | 137/15.1 |
| 5,881,758 A | 3/1999 | Koncsek et al. | |
| 6,793,175 B1 * | 9/2004 | Sanders | B64C 30/00 |
| | | | 137/15.1 |
| 7,048,229 B2 | 5/2006 | Sanders et al. | |
| 8,434,723 B2 | 5/2013 | Simpson et al. | |
| 8,656,957 B2 | 2/2014 | Babinsky et al. | |
| 2006/0107648 A1 | 5/2006 | Bulman et al. | |
| 2007/0181743 A1 * | 8/2007 | Klinge | B64C 21/10 |
| | | | 244/62 |
| 2008/0060361 A1 | 3/2008 | Morrison et al. | |
| 2008/0092519 A1 | 4/2008 | Bulman | |
| 2008/0283677 A1 | 11/2008 | Pederson et al. | |
| 2009/0288711 A1 * | 11/2009 | Alvi | B64D 33/02 |
| | | | 137/1 |
| 2012/0049008 A1 | 3/2012 | Domel et al. | |
| 2013/0291553 A1 * | 11/2013 | Leland | F02C 7/141 |
| | | | 60/782 |
| 2014/0182697 A1 * | 7/2014 | Davidenko | F02C 7/057 |
| | | | 137/15.1 |
| 2014/0224949 A1 | 8/2014 | Rybalko et al. | |
| 2016/0376018 A1 * | 12/2016 | Troia | B64C 23/04 |
| | | | 244/53 B |
| 2017/0066527 A1 * | 3/2017 | Huynh | B64D 33/02 |

FOREIGN PATENT DOCUMENTS

| | | |
|---|---|---|
| EP | 1988266 | 11/2008 |
| EP | 2660442 | 11/2013 |
| WO | 2017/158857 A1 | 9/2017 |

OTHER PUBLICATIONS

International Search Report and Written Opinion for corresponding International Application No. PCT/US2019/030852 dated Jul. 15, 2019.

Sabean et al., "Computational Optimization of a Hypersonic Rectangular-to-Circular Inlet", Journal of Propulsion and Power, vol. 17, No. 3, May-Jun. 2001, pp. 571-578.

Sabean et al., "Optimization of a Hypersonic Inlet with a Rectangular to Circular Transition", American Institute of Aeronautics & Astronautics, AIAA 99-0612, 1999, pp. 1-9.

Gounko et al., "Numerical investigation of flow over two sweepback wedges at M=4 and 6", Thermophysics and Aeromechanics, vol. 20, No. 2, 2013, pp. 179-193.

Settles et al., "Investigation of Three-Dimensional Shock/Boundary-Layer Interactions at Swept Compression Corners", AIAA Journal, vol. 18, No. 7, Jul. 1980, pp. 779-785.

Settles et al., "Cylindrical and Conical Flow Regimes of Three-Dimensional Shock/Boundry-Layer Interactions", AIAA Journal, vol. 22, Feb. 1984, pp. 194-200.

Inger, "Supersonic Viscous-Inviscid Interaction of a Swept Ramp with a Turbulent Boundary Layer", AIAA-85-1669, Jul. 1985, 60 pages.

Stalker, "Spanwise Propagation of Disturbances in Swept Shock Wave—Boundary Layer Interactions", AIAA-82-0988, Jun. 1982, 9 pages.

Zheltovodov et al., "Shock Wave-Boundary-Layer Interactions", Chapter 5.3.4 "Swept Compression Ramp; Interaction and Its Modeling", 2011, pp. 230-237.

* cited by examiner

US 11,053,018 B2

FLIGHT VEHICLE ENGINE INLET WITH INTERNAL DIVERTER, AND METHOD OF CONFIGURING

FIELD OF THE INVENTION

The invention is in the field of engine inlets for flight vehicle engines.

DESCRIPTION OF THE RELATED ART

Air-breathing engine inlets have sometimes used internal diverters to remove or otherwise ameliorate boundary layers that may otherwise detrimentally affect engine performance. However internal diverters themselves have been associated with detrimental flow effects, for example flow disruptions such as shocks or expansion fans.

SUMMARY OF THE INVENTION

An internal diverter for an engine inlet is configured to follow streamlines of a flow field that is also used in configuring walls of the inlet.

An internal diverter for an engine inlet is configured to avoid disturbing flow outside the internal diverter through the inlet.

An internal diverter for an engine inlet can have an arbitrarily-shaped leading edge, within a virtual diverter-creating shape that is used to configure the internal diverter.

A method for configuring an internal diverter for diverting a boundary layer of flow through an engine inlet includes configuring a diverter-creating shape along streamlines of a flow field used in configuring walls of the inlet, and configuring the internal diverter within the virtual diverter-creating shape.

According to an aspect of the invention, an inlet for a flight vehicle engine, the inlet includes: streamline-traced inlet walls; and a streamline-traced diverter within one of the inlet walls, for removing boundary layer flow along one of the inlet walls. A similar flow field is used to configure both the streamline-traced inlet walls and the streamline-traced diverter.

According to an embodiment of any paragraph(s) of this summary, the inlet walls are created using an inlet-creating shape.

According to an embodiment of any paragraph(s) of this summary, the internal diverter is created using a diverter-creating shape.

According to an embodiment of any paragraph(s) of this summary, the flow field used for making the inlet-creating shape and the diverter-creating shape is a function of a flow-generating shape, a contraction ratio, and a Mach number.

According to an embodiment of any paragraph(s) of this summary, the inlet-creating shape has a different aspect ratio from the diverter-creating shape.

According to an embodiment of any paragraph(s) of this summary, the diverter-creating shape is wider than the inlet-creating shape.

According to an embodiment of any paragraph(s) of this summary, the one of inlet walls is a top wall of the inlet.

According to an embodiment of any paragraph(s) of this summary, a leading edge of the internal diverter is downstream from an upstream end of the inlet.

According to an embodiment of any paragraph(s) of this summary, a leading edge of the internal diverter is angled at a nonzero angle relative to freestream flow through the inlet.

According to an embodiment of any paragraph(s) of this summary, the leading edge of the internal diverter is angled differently than a leading edge of the one of the inlet walls.

According to an embodiment of any paragraph(s) of this summary, the leading edge of the internal diverter includes multiple linear segments angled relative to each other.

According to an embodiment of any paragraph(s) of this summary, a downstream end of the internal diverter blends with the one of the inlet walls.

According to an embodiment of any paragraph(s) of this summary, the inlet walls have one or more slots through which flow captured by the internal diverter is directed out of the inlet.

According to an embodiment of any paragraph(s) of this summary, the inlet is a rectangular inlet.

According to an embodiment of any paragraph(s) of this summary, the inlet is a rounded inlet.

According to an embodiment of any paragraph(s) of this summary, the inlet is a circular inlet.

According to another aspect of the invention, a method of configuring an inlet for a flight vehicle engine includes the steps of: configuring streamline-traced walls of the inlet; and configuring a streamline-traced diverter within one of the inlet walls, for removing boundary layer flow along one of the inlet walls. The inlet walls are configured using an inlet-creating shape along streamlines of a flow field. The internal diverter is configured using a diverter-creating shape along streamlines of the flow field.

According to an embodiment of any paragraph(s) of this summary, the method further includes, prior to the configuring of the streamline-traced walls and the configuring of the streamline-traced diverter, generating the inlet-creating shape from the flow field; and generating the diverter-creating shape from the flow field.

According to an embodiment of any paragraph(s) of this summary, the configuring of the internal diverter includes configuring a leading edge of the internal diverter to achieve desired radar-detection characteristics.

According to an embodiment of any paragraph(s) of this summary, the configuring of the internal diverter includes configuring a leading edge of the internal diverter with multiple linear segments.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

DETAILED DESCRIPTION

An inlet for a flight vehicle engine, such as for a supersonic or hypersonic engine, includes an internal flow diverter to divert boundary layer flow. The flow diverter is configured to minimize disruption to flow outside the diverted boundary by being configured through use of a flow field that is also used to configure the walls of the inlet. The flow field that is used to configure an inlet-creating shape and a diverter-creating shape has the same flow generator, contraction ratio, compression ratio, mass capture ratio, pressure ratio between entrance and exit, and/or Mach number, for example. The internal diverter may be configured so as to allow selection of a leading edge shape for the internal diverter, for example to use a shape that helps avoid radar detection.

Figure 1:
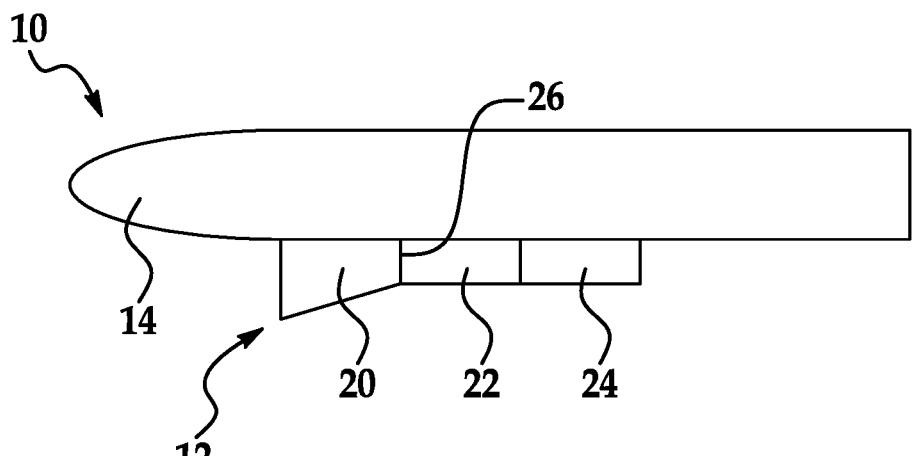
FIG. 1 is a schematic view of a flight vehicle that includes an engine with an inlet according to an embodiment of the invention.

FIG. 1 schematically shows an air vehicle 10 that is powered by a propulsion system 12 that is mechanically coupled to a fuselage 14. The air vehicle 10 may be a missile, projectile, an unmanned aircraft (an unmanned aerial vehicle or UAV), manned aircraft or an access-to-space vehicle. The air vehicle may have any of a variety of sizes, and any of a variety of operating conditions. In much of the description below the air vehicle 10 is described in terms of a high supersonic to hypersonic air vehicle, with a Mach number ranging from 4 to 6, or more broadly with a Mach number of 2 to 25. However the air vehicle 10 may operate at lower supersonic speeds (Mach number greater than one), or even at subsonic speeds.

The propulsion system 12 may be coupled to the fuselage 14 in any of a variety ways, including parts of the propulsion system 12 being integrally formed with parts of the fuselage 14. The fuselage 14 may have any of a variety of suitable shapes, and may include additional components for carrying out one or more operations of the air vehicle 10. Such additional components, to give a few non-limiting examples, may include control systems (such as for steering), lift-producing and/or control surfaces (such as wings, fins, or canards, either fixed in position or movable in whole or in part), communication systems, cooling systems, sensors or other data-collecting systems, and/or any of a variety of payloads.

Figure 2:
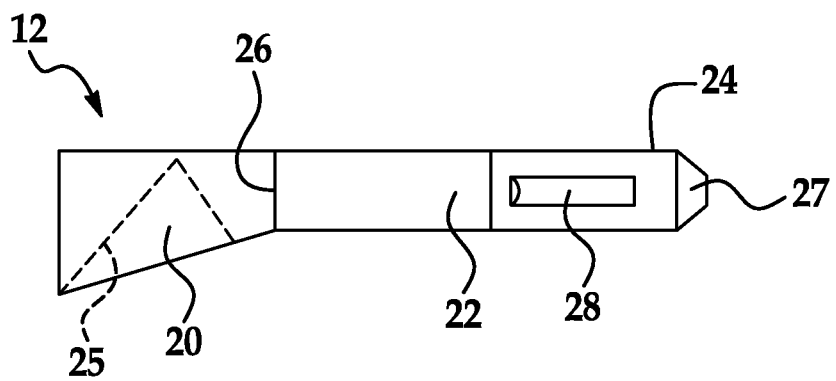
FIG. 2 is a schematic view of a propulsion system that includes the inlet of FIG. 1.

With reference in addition to FIG. 2, the propulsion system 12 includes an air inlet 20, an isolator or diffuser 22, and a combustor or engine combustor 24. Various shocks 25 occur upstream of and in the various parts of the propulsion system 12. The air inlet 20 takes in air from the freestream and compresses the air, with one or more shocks perhaps occurring as the flow is compressed. The flow captured by the inlet 20 is also decelerated in the inlet 20. The compressed air then exits the air inlet 20 to enter into the isolator 22. There may be a throat 26, a minimum area location at the boundary between the air inlet 20 and the isolator 22.

The isolator 22 functions to keep the shocks stable, isolates dynamic flow fluctuations between the inlet and engine, provides demanded pressure rises, and/or provides desired flow patterns at its downstream end, where the air passes from the isolator 22 to the combustor 24. There may be a shock train at lower flight speeds that further decelerates flow from supersonic at the throat 26, to subsonic at the entrance to the combustor 24.

In the combustor 24 fuel is added to the air flow, mixed, combustion occurs, and the combusted flow is passed through a nozzle 27, producing thrust from the propulsion system 12, which is used to propel the air vehicle 10. Combustion products are exhausted from a downstream end of the combustor 24 through the nozzle 27. The propulsion system 12 thus defines a flow path or propulsion flow path through the inlet 20, the isolator 22, the engine combustor 24, and the nozzle 27.

The combustor 24 may be any of a variety of suitable devices for burning a fuel-air or fuel-oxidizer mixture and producing thrust. For example the combustor 24 (and/or the engine 12) may be a ramjet, a scramjet, a dual-mode ramjet/scramjet, constant-volume combustion device, or perhaps a turbojet. In FIG. 2 the combustor 24 is shown as having a turbine 28, but in many embodiments the combustor 24 has no turbine (or other moving parts).

In general the inlet 20 may have any of a variety of suitable shapes, for example being round, elliptical, or rectangular. The isolator 22 may have a general shape that makes the transition between a square, rectangular, trapezoidal or elliptical shape of the inlet 20 (to give a few examples) to a round or other-shaped combustor 24. The inlet 20 and the combustor 24 may be in line with each other, or may be offset from one another and at different angular orientations. Many variations are possible for the configuration of the isolator 22, and the examples given herein should not be considered as limiting to the invention.

Figure 3:
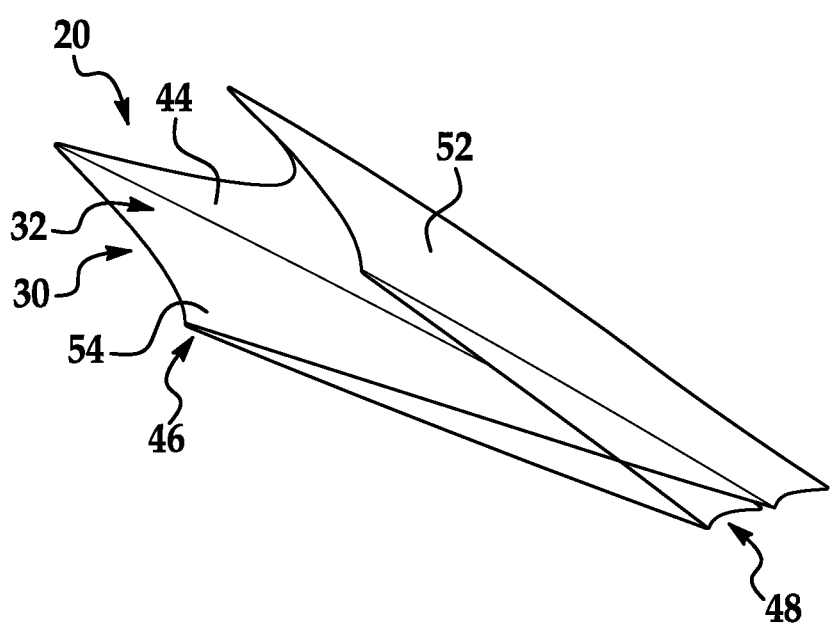
FIG. 3 is an oblique view of the inlet of FIG. 1.

FIG. 3 shows further details of one embodiment of the inlet 20. The inlet 20 includes walls 30 that define an interior space 32 within the walls 30. Air enters the interior space 32 and is compressed and directed downstream to the isolator 22 (FIG. 2).

Figure 4:
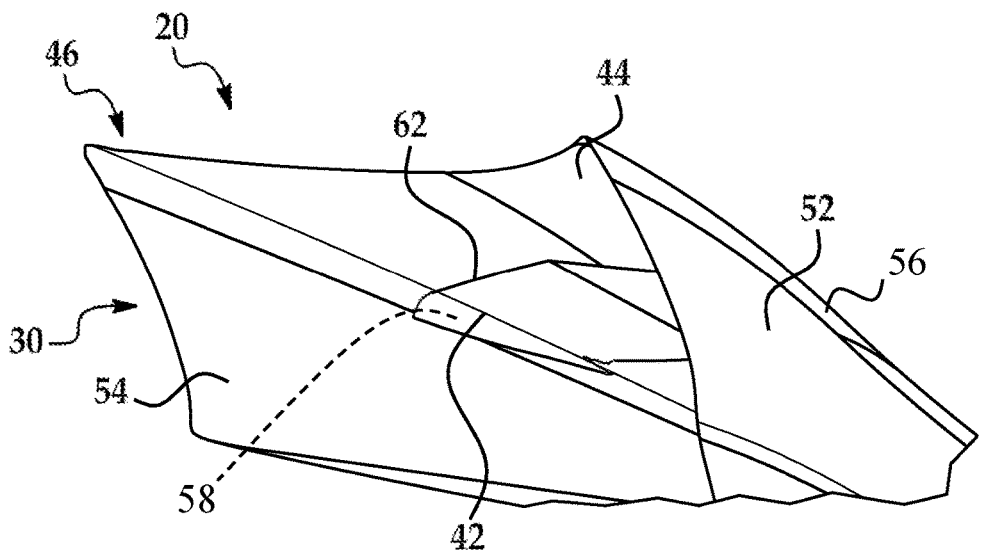
FIG. 4 is another oblique view, or part of the inlet of FIG. 1, showing an internal diverter of the inlet.
Figure 5:
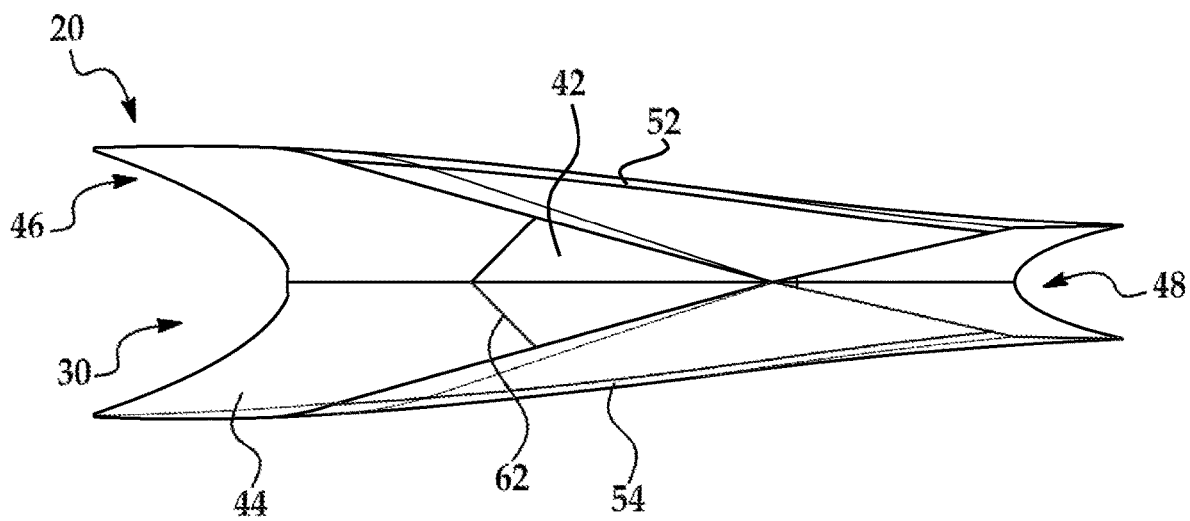
FIG. 5 is a bottom view of the inlet of FIG. 1.

Referring now in addition to FIGS. 4 and 5, the inlet 20 includes a flow diverter 42 that is used to skim off a boundary layer of the flow from a top wall 44 of the inlet 20. The internal diverter 42 is spaced away from the top wall 44 at a front end 46 of the internal diverter 42. The internal diverter 42 is angled back in toward the top wall 44, and in the illustrated embodiment the internal diverter 42 makes contact with top wall 44 toward a downstream end 48 of the internal diverter 42.

The flow diverter 42 is attached to side walls 52 and 54, near the tops of the side walls 52 and 54. The boundary layer flow captured by the internal diverter 42 is directed through slots 56 and 58 at the sides of the inlet 20, out of the inlet 20.

Removing the boundary layer flow using the internal diverter 42 may improve performance of the engine combustor 24 (FIG. 2), for example by providing more uniform momentum in the intake air provided to the combustor 24.

It is advantageous that the internal diverter 42 not unnecessarily impact the flow of air through the inlet 20. Toward that end, the internal diverter 42 may be configured such that the flow qualities within the inlet 20 maintain the same sort of flow used in configuring the inlet walls 30. For example the inlet walls 30 may be configured using streamline traces in a defined flow field, and the internal diverter 42 may be configured using the same flow field. This helps in maintaining the flow qualities of the original inlet shape. The internal diverter 42 has an aft-swept leading edge 62, which is one of a variety of possible leading edge shapes, as is discussed further below.

The illustrated inlet 20 has a rectangular cross-section shape. Alternatively the inlet 20 could have other suitable shapes, such as trapezoidal, rounded, or circular. More broadly, the inlet could have any of a variety of further shapes, such as any shapes used to conform to a vehicle body shape.

Figure 6:
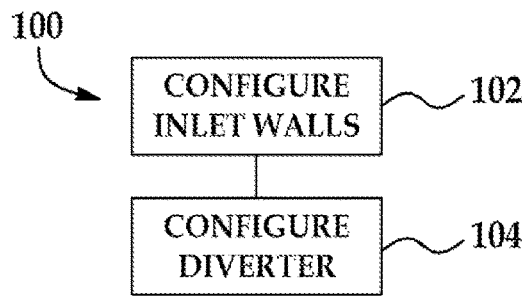
FIG. 6 is a high-level flow chart, showing steps in configuring the inlet.

FIG. 6 shows a high-level flow chart of a method or process 100 of configuring the inlet. In step 102 the inlet walls 30 (FIG. 3) are streamlined traced using a flow field. The flow field is a theoretical (ideal) flow field past a surface or shape, such as a Busemann inlet. The flow field may model a supersonic flow field with characteristics, such as Mach number, contraction ratio (the ratio of the upstream and downstream areas of the inlet), compression ratio, pressure ratio between entrance and exit, mass capture ratio, pressure ratio between entrance and exit, and air pressure, corresponding to operating conditions for the engine. Shock locations within the flow field may be determined based on the flow characteristics. These factors may be taken into account in configuring the walls 30 of the inlet 20.

Figure 7:
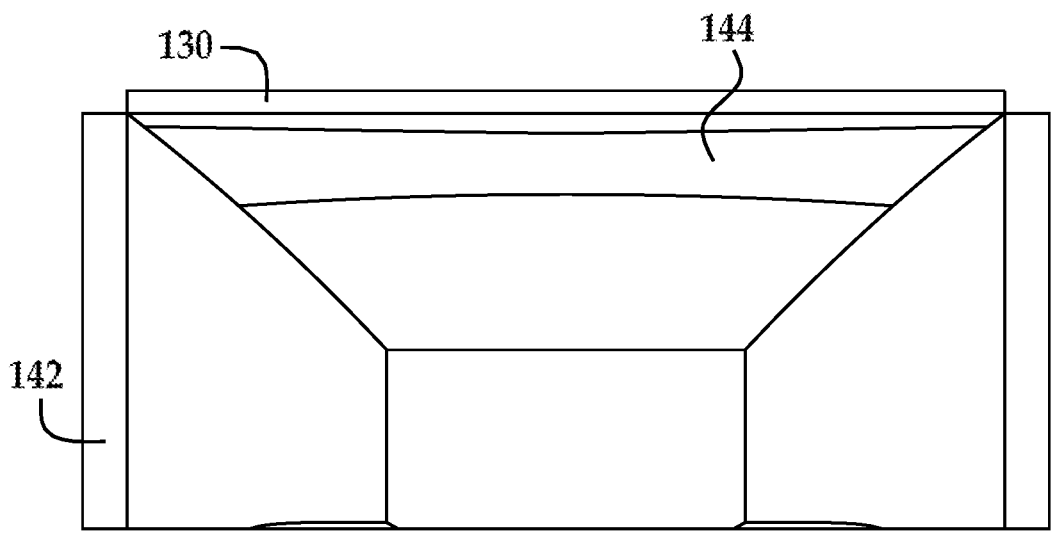
FIG. 7 is a view of surfaces generated in configuring the inlet walls and the internal diverter.

In step 104 a shape is used for configuring the internal diverter 42 (FIG. 4). The diverter-configuring shape is a shape created using the same flow field as was used in step 102 to configure the inlet walls 30. The similarity includes (for example) using the same original generating body for streamline tracing, a geometrically similar leading edge shape (of higher aspect ratio), the same Mach number and contraction ratio, and the same throat shape. The identity of the throat shape may be used to allow the internal diverter 42 to blend into the shape of the inlet walls 30. As illustrated in FIG. 7, the diverter-creating shape 142 has a shape similar to that of an inlet-creating shape 130 used for configuring the inlet walls 30 (FIG. 3). As illustrated, the diverter-creating shape 142 is shorter and wider than the inlet-creating shape 130, giving the diverter-creating shape 142 a larger aspect ratio than the inlet-creating shape 130. That the diverter-creating shape 142 is shorter than the inlet-creating shape 130, with a vertical separation at a forward part of the shapes 130 and 142. The amount of this separation (a vertical separation in the illustrated embodiment) corresponds to a desired height of the boundary layer to be removed at the axial station of interest. The shapes 130 and 142 are configured to converge with each other downstream of their leading edges, because the shapes 130 and 142 blend to the same throat shape.

The flow diverter 42, or most of the flow diverter 42 (such as the upstream-most part of the flow diverter 42) may be selected at any of a variety of locations within the diverter-creating shape 142. One example is shown as reference number 144 in FIG. 7. Thus the diverter-creating shape 142 is acting as a template for configuring the internal diverter 42.

The intersection of the inlet walls 30 and the internal diverter 42 form the lateral extent of the surface 142. The intersection of the original inlet top wall 44 and the diverter wall 42 form the aft extent of the internal diverter surface 42.

One advantage of configuring the flow diverter 42 to be on the shape 142 is that this minimizes disruption of the flow through the inlet 20. This is so, at least in part, because the shape 142 is on streamlines similar to the same flow as that used for creating the inlet walls 30. Because the diverter shape is along streamlines of the original inlet, the leading edge of the diverter surface may exist at any location on the diverter, and may be of arbitrary (or at least somewhat arbitrary) shape. Another advantage is that this process allows variability in the shape of the leading edge of the internal diverter 42, without causing significant impact or disruption on the flow. The trailing edge of the internal diverter 42 is where the internal diverter 42 merges with the walls 30, may correspond to a location where the shapes 130 and 142 converge, such as at or near a downstream throat of the inlet 20.

The method 100 allows the internal diverter 42 to be configured with its leading edge away from an upstream end of the inlet 20, which is in contrast to how diverters are usually configured. The placement of the diverter edge downstream of the upstream end of the inlet 20 allows more flexibility in the configuration of diverters, for example to achieve desired characteristics in radar visibility.

Streamline-traced inlets tend to be long and have a boundary layer concentrated along the center of the body of the inlet. An inlet diverter such as the internal diverter 42 helps reduce the opportunity for boundary-layer separation along the inlet centerline. The internal diverter 42 may also be useful in aiding the inlet starting process.

Many different types of flow fields may be used in configuring the shapes 130 and 142, for example modeling flow over wedges, cones, osculating cones, or in a Busemann inlet. For example, in a supersonic flow over a sharp-edged wedge, the streamlines downstream of a shock anchored on the front edge are identical, regardless of position on the shock. The streamlines are also tangent to the generating wedge, with no curvature, and flow field properties downstream of the leading shock are uniform.

The shapes 130 and 142 may be shaped to follow any of a variety of Busemann-based inlet shapes, for example by use of computer tools for generating blended, streamline-traced Busemann inlets with arbitrary leading edges and throats. The leading edge can be configured with a shape selected for ease of manufacture, such as a straight leading edge, or a leading edge made up of line segments. As an alternative to Busemann inlet flows, any three-dimensional flowfield may be used as a generator.

FIGS. 8-11 shows various possible configurations of the internal diverter, with various leading edge shapes and/or positions within the inlet 30. It will be appreciated that the illustrated embodiments are only examples, and that a variety of other leading edge shapes are possible. As an example, the leading edges may be curvilinear.

Figure 8:
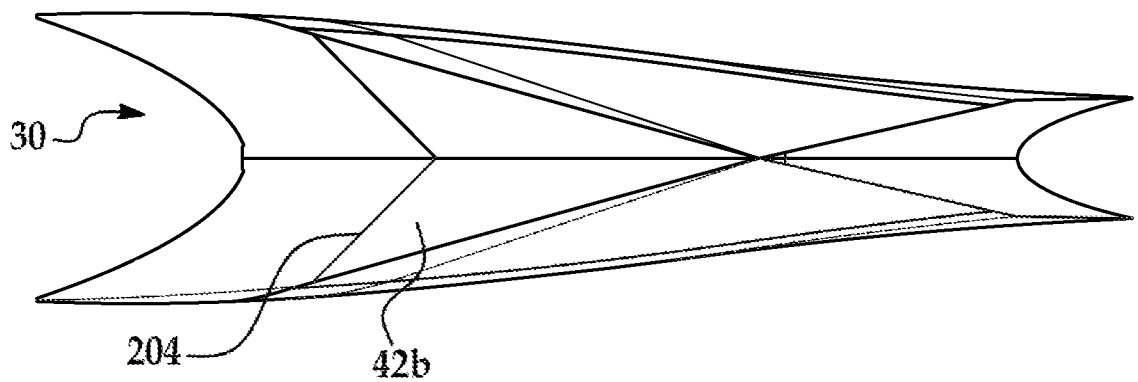
FIG. 8 is a view of an inlet according to a first alternate embodiment of the invention.
Figure 9:
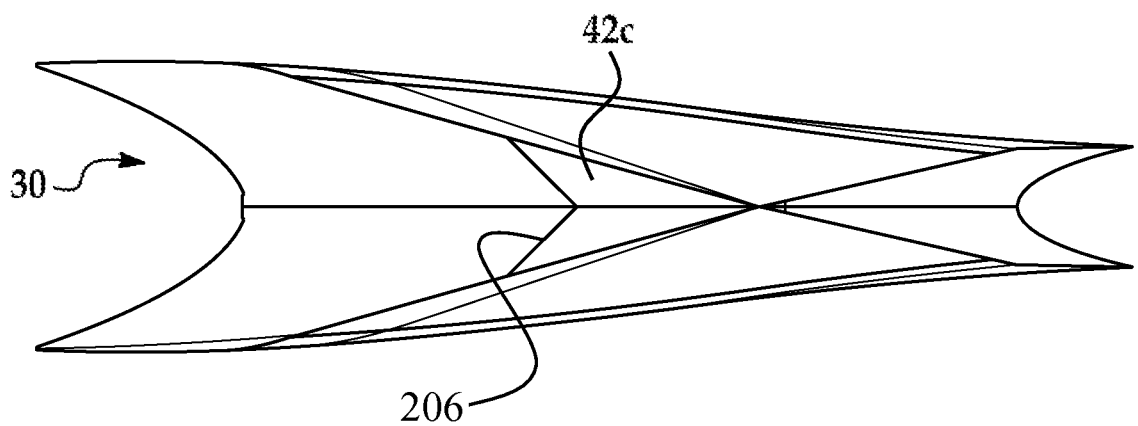
FIG. 9 is a view of an inlet according to a second alternate embodiment of the invention, with the diverter surface moved aft.
Figure 10:
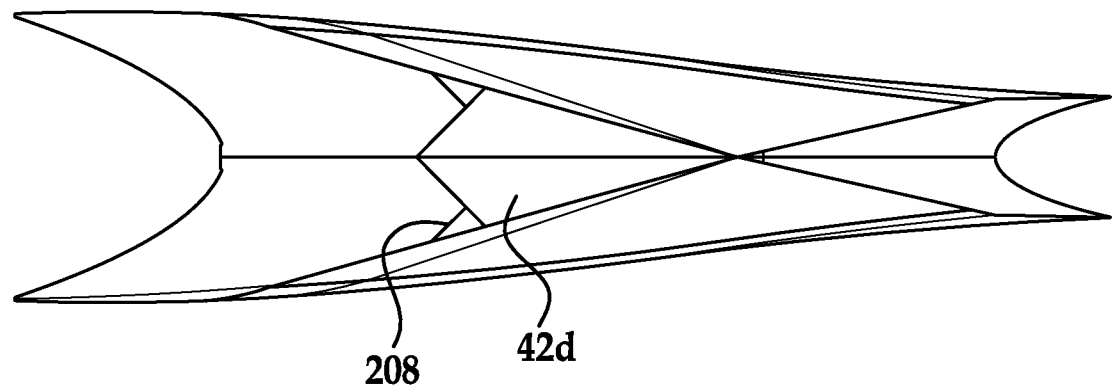
FIG. 10 is a view of an inlet according to a third alternate embodiment of the invention.
Figure 11:
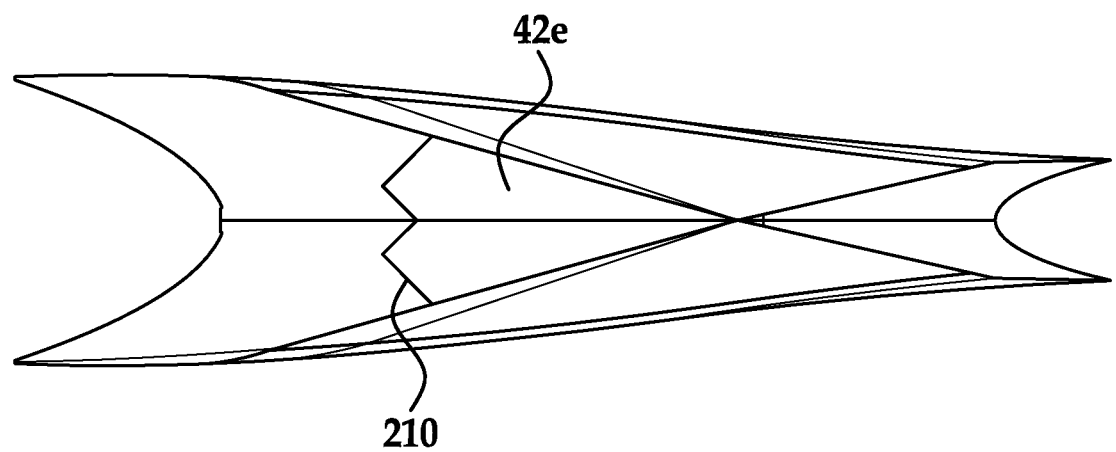
FIG. 11 is a view of an inlet according to a fourth alternate embodiment of the invention.

FIG. 8 shows an internal diverter 42b with a single-notch leading edge 204. The internal diverter 42b is in a relatively close to a leading edge (upstream end) 206 of the inlet 30, while still being downstream from the inlet upstream end 206. FIG. 9 shows an internal diverter 42c that has the same shape as the internal diverter 42b, while being further downstream within the inlet 30. FIG. 10 shows an internal diverter 42d with a W-shape leading edge 208, with multiple line segments angled relative to one another. FIG. 11 shows another example, an internal diverter 42e with a W-shape leading edge 210.

Figure 12:
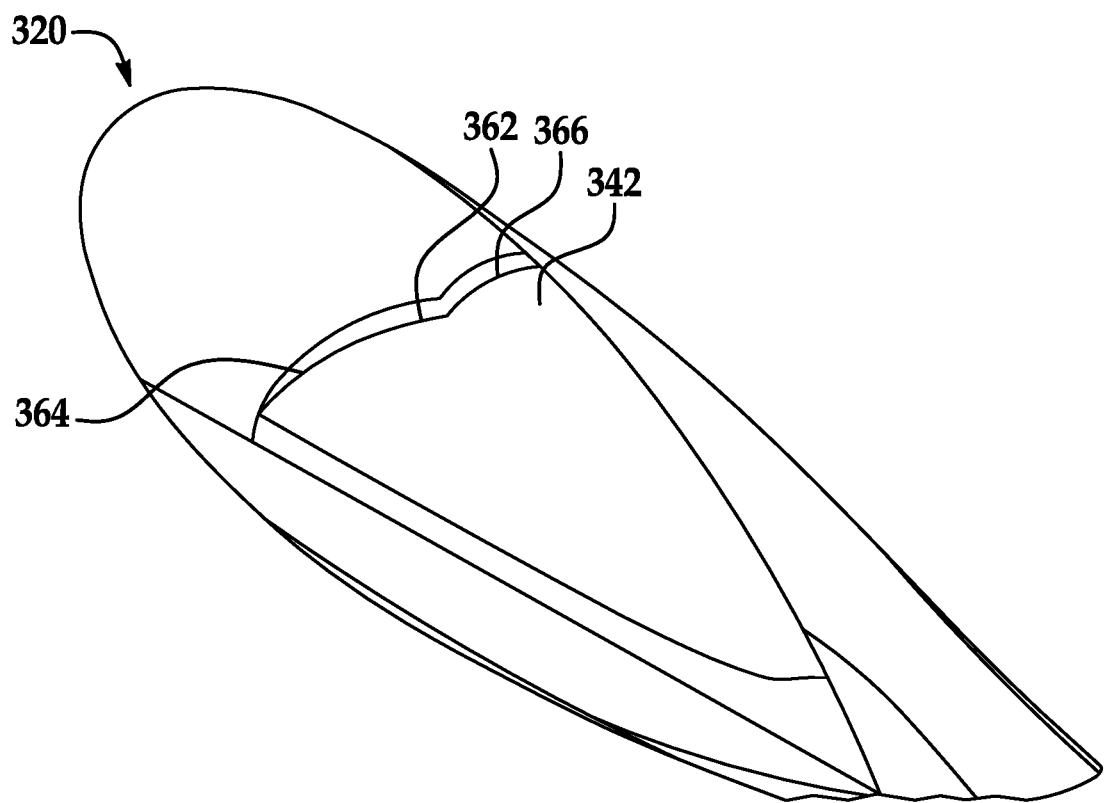
FIG. 12 is an oblique view of an underside of an inlet according to a fifth alternate embodiment of the invention.
Figure 13:
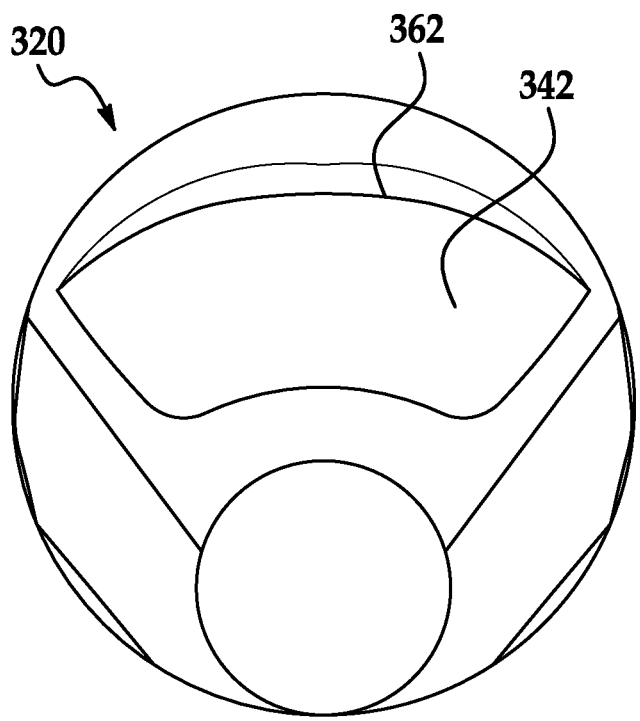
FIG. 13 is an end view looking down the throat of the inlet of FIG. 12.

FIGS. 12 and 13 show another example, with an internal diverter 342 in an inlet 320 that has a circular cross-section shape. The diverter 342 has a leading edge 362 with a pair of curved portions 364 and 366 that extend into the flow.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of configuring an inlet for a flight vehicle engine, the method comprising:
    configuring streamline-traced inlet walls of the inlet; and
    configuring a streamline-traced diverter within one of the streamline-traced inlet walls, for removing boundary layer flow along the one of the streamline-traced inlet walls;
    wherein the streamline-traced inlet walls are configured using an inlet-creating shape along streamlines of a flow field; and
    wherein the streamline-traced internal diverter is configured using a diverter-creating shape along streamlines of the flow field used for the inlet-creating shape.

2. The method of claim 1,
    further comprising, prior to the configuring the streamline-traced inlet walls and the configuring the streamline-traced diverter,
        generating the inlet-creating shape from the flow field; and
        generating the diverter-creating shape from the flow field;
    wherein the flow field is a function of a flow-generating shape, a contraction ratio, and a Mach number.

3. The method of claim 2, wherein the configuring the streamline-traced internal diverter includes configuring a leading edge of the streamline-traced internal diverter to achieve desired radar-detection characteristics.

4. The method of claim 2, wherein the configuring the streamline-traced internal diverter includes configuring a leading edge of the streamline-traced internal diverter with multiple linear segments.

5. The method of claim 1 further comprising forming the one of the streamline-traced inlet walls as a top wall of the inlet.

6. The method of claim 5 further comprising:
    forming the streamline-traced inlet walls to include side walls that adjoin the top wall; and
    attaching the streamline-traced internal diverter to the side walls.

7. The method of claim 1, further comprising forming a downstream end of the streamline-traced internal diverter to includes an intersection between the inlet-creating shape and the diverter-creating shape.

8. The method of claim 1, further comprising forming the inlet to have at least a slot through which flow captured by the streamline-traced internal diverter is directed out of the inlet.

9. The method of claim 1 further comprising forming the inlet-creating shape to have a different aspect ratio from the diverter-creating shape.

10. The method of claim 9 further comprising forming the diverter-creating shape to be wider than the inlet-creating shape.

11. The method of claim 1 further comprising angling the leading edge of the streamline-traced internal diverter at a nonzero angle relative to freestream flow through the inlet.

12. The method of claim 11 further comprising angling the leading edge of the streamline-traced internal diverter differently than a leading edge of the one of the streamline-traced inlet walls.

13. The method of claim 11 further comprising forming the leading edge of the streamline-traced internal diverter to include multiple linear segments angled relative to each other.

14. The method of claim 1 further comprising forming a downstream end of the streamline-traced internal diverter to blend with the one of the streamline-traced inlet walls.

15. The method of claim 1 further comprising forming the inlet walls to have one or more slots through which flow captured by the streamline-traced internal diverter is directed, out of the inlet.

16. The method of claim 1 further comprising forming the inlet as a rectangular inlet.

17. The method of claim 1 further comprising forming the inlet as a rounded inlet.

18. The method of claim 1 further comprising forming the inlet as a circular inlet.

* * * * *